Aug. 8, 1961  K. H. MANSACHS  2,995,046
POWER TRANSMISSION MECHANISM
Filed Oct. 30, 1959

INVENTOR
Kaj Henning Mansachs
BY
Pennie Edmonds Morton Barrows Taylor
ATTORNEYS

United States Patent Office 2,995,046
Patented Aug. 8, 1961

2,995,046
POWER TRANSMISSION MECHANISM
Kaj Henning Mansachs, Copenhagen V, Denmark, assignor to F. L. Smidth & Co., New York, N.Y., a corporation of Delaware
Filed Oct. 30, 1959, Ser. No. 849,862
Claims priority, application Great Britain July 6, 1959
5 Claims. (Cl. 74—410)

This invention relates to a power transmission mechanism for coupling a driving shaft to a driven shaft and including a gear train. More particularly, the invention is concerned with a power transmission of the type stated, in which provision is made for obtaining equal distribution of the load on the parts of the mechanism by insuring equal pressures on the teeth of gears of the train, which are operating in parallel. The transmission mechanism of the invention may be used for many purposes and is especially adapted for heavy duty use as in the driving of large grinding mills. A form of the transmission suitable for driving such a mill will, accordingly, be illustrated and described in detail for purposes of explanation.

Figure 1:
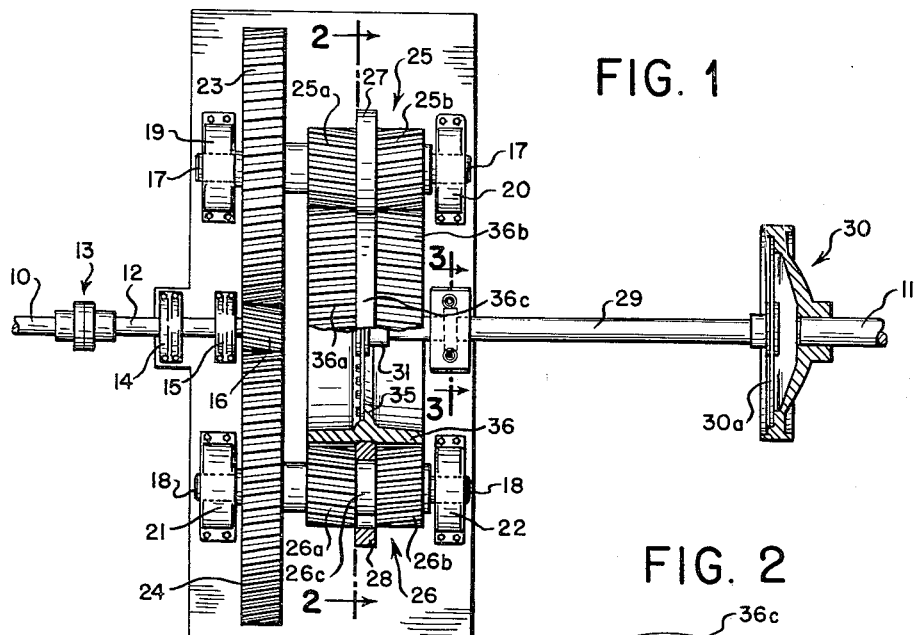
Figure 2:
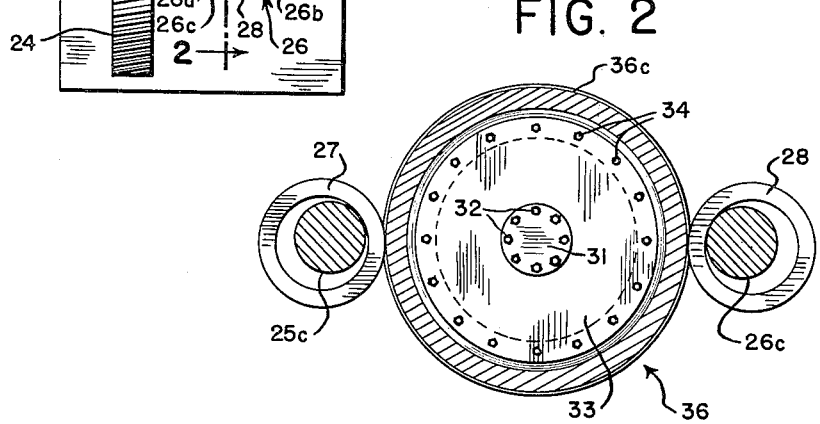
Figure 3:
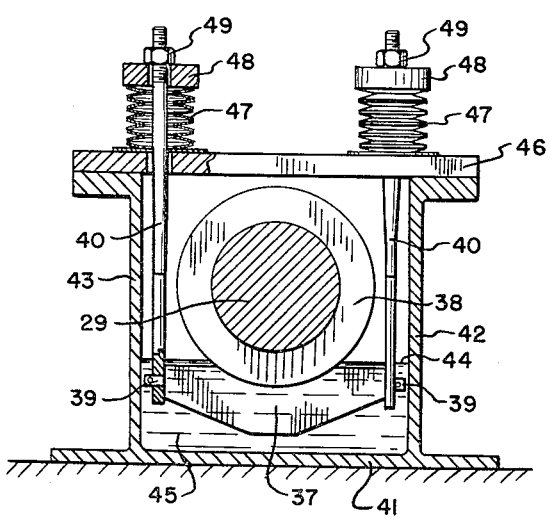

For a better understanding of the invention, reference may be made to the accompanying drawing, in which:

FIG. 1 is a plan view of one form of power transmission of the invention with parts broken away and the housing removed; and FIGS. 2 and 3 are sectional views on the lines 2—2 and 3—3, respectively, of FIG. 1.

In the drawing, the power transmission mechanism embodying the invention is illustrated as transmitting power from a driving shaft 10 to a driven shaft 11. The driving shaft may be the shaft of a motor and the driven shaft may be that of a rotary drum, such as a grinding mill employed in the cement industry.

The transmission mechanism includes an input shaft 12 connected to the driving shaft 10 by a coupling 13, the parts of which are mounted on the shafts 10 and 12. The input shaft is mounted for rotation in bearings 14, 15, one of which is preferably a thrust bearing, and, beyond the bearings, the shaft carries a pinion 16 illustrated as provided with single helical teeth. A pair of intermediate shafts 17, 18 are mounted on opposite sides of and parallel to shaft 12 and the shaft 17 is mounted in bearings 19, 20, of which the bearing 19 is a thrust bearing. The shaft 18 is mounted in bearings 21, 22, of which the bearing 21 is a thrust bearing. Gears 23, 24 meshing with the pinion 16 are mounted on the shafts 17, 18, respectively, and, between the gear 23 and the bearing 20, the shaft 17 carries a pinion 25 which is divided into sections 25a, 25b carrying herringbone teeth separated by a smooth cylindrical section 25c. The shaft 18 carries a pinion 26 between the gear 24 and the bearing 22 and the pinion is formed of sections 26a, 26b carrying herringbone teeth and separated by a smooth cylindrical section 26c. The cylindrical sections 25c and 26c of the pinions 25, 26 are encircled by rings 27, 28, respectively, and the rings have an inner diameter substantially greater than the diameter of the cylindrical sections which they encircle.

The transmission device has an output shaft 29 connected to the driven shaft 11 through a membrane coupling 30, the membrane 30a of which is secured to the output shaft. At its other end, the output shaft carries a hub 31 secured by bolts 32 to the inner edge of a membrane 33, which may be made of a number of circular flexible steel plates. The membrane is secured along its outer edge by bolts 34 to an internal flange 35 which is an integral part of a gear 36. The gear is formed with sections 36a, 36b having teeth in mesh with the toothed sections 25a, 26a and 25b, 26b, respectively, of the pinions 25, 26. The sections 36a, 36b of the gear are separated by a smooth cylindrical section 36c which lies in the same plane as the cylindrical sections 25c and 26c of the pinions 25, 26. The rings 27, 28 are of such thickness that, as shown in FIG. 2, they bear against the cylindrical sections of the pinions above the horizontal and against the cylindrical section of the gear substantially in a horizontal plane. As a result, the rings act by gravity to exert forces on the pinions directed toward the axis of the intermediate shafts 17, 18 and on the gear 36 directed toward its axis. Such forces tend to keep the gear 36 at equal distances from the axes of shafts 17, 18 but the rings permit the gear 36 to move relative to the shafts to obtain the most favorable engagement of the teeth of the gear with those of the pinions 25, 26 at all times.

The output shaft 29 is supported between its ends for movement in a plane normal to its axis on a slide shoe 37, the upper surface of which is concave and engages a collar 38 on the output shaft. At its ends, the shoe is provided with pins 39 which extend through openings in hangers which may take the form of bolts 40. The shoe lies within a casing forming part of the housing of the mechanism and encircling the output shaft. The casing comprises a base 41, from which rise end walls 42, 43 on opposite sides of the shaft 29 and extending above the collar 38 thereon, and the casing also includes partial side walls 44 at opposite sides of the shoe, only one of the side walls being shown. The base, end, and side walls form a chamber containing a quantity of lubricant 45, within which the shoe lies. The casing is provided with a top 46 having openings, through which the hangers 40 extend, and the hangers are resiliently supported. For this purpose, each hanger extends through a stack of annular disk springs 47 supported by the casing top 46 and is provided at its upper end with a washer 48 resting on top of the stack of springs and held in place by a nut 49 threaded on the hanger. With this arrangement, the nuts on the hangers can be adjusted when the mechanism is at rest, to adjust the position of the output shaft 29 to insure the proper meshing of the gear 36 with the pinions 25, 26. In such adjustment, the rings 27, 28 function as above described to position the gear in proper relation to the pinions.

The entire transmission mechanism is enclosed within the usual housing which has been omitted from the drawing in the interest of clearness. Such a housing includes a base supporting the bearings for the input and intermediate shafts and the casing enclosing the slide shoe.

In the operation of the transmission mechanism, the output shaft is free to move in a plane normal to its axis because of its being coupled to the driven shaft by a membrane coupling and because of the resilient mounting of the slide shoe. Such movements of the output shaft are damped by the action of the disk springs.

Because of the freedom of movement of the output shaft 29 and the use of the membrane as a means of attaching the gear 36 to that shaft, the gear may be considered to float and the rings 27, 28 tend to insure equal pressures on the gear teeth in engagement with the pinions of opposite sides of the gear. Equal power distribution is thus insured between the two intermediate shafts and injurious effects arising from clearance in bearings, manufacturing inaccuracies, and wear of the components of the mechanism are largely avoided.

I claim:

1. A power transmission mechanism for coupling a driving shaft to a driven shaft, which comprises an input shaft adapted to be connected to the driving shaft, a pair of parallel intermediate shafts, gearing connecting the input and intermediate shafts, a pinion on each intermediate shaft, an output shaft adapted to be connected to the driven shaft, a gear mounted on the output shaft and lying between and meshing with the pinions, a slide shoe engaging the output shaft from beneath to support it, and means for supporting the shoe for limited movements in all directions in a plane normal to the axis of the output shaft, said means including a pair of springs supporting respective ends of the shoe, a pair of hangers connected to the shoe and extending upwardly at opposite sides of the output shaft and elements connected to the hangers and resting on the respective springs.

2. The power transmission mechanism of claim 1, in which each pinion and the gear is formed with two toothed sections separated by a cylindrical section, the teeth on the toothed sections of the gear meshing with the teeth on the toothed sections of the pinion and the cylindrical section of the gear being spaced from the cylindrical sections of the pinions, and a ring encircling the cylindrical section of each pinion, the ring having a larger internal diameter than the diameter of the cylindrical pinion section and the outer surface of the ring engaging the cylindrical section of the gear.

3. The power transmission of claim 1, in which the springs are stacks of disk springs having open centers, the hangers extend through the openings of the springs of respective stacks, a washer on each hanger rests on top of the associated spring stack, and a nut threaded on each hanger limits upward movement of the washer on that hanger.

4. The power transmission mechanism of claim 3, which includes a casing encircling the output shaft and enclosing the shoe, the hangers extending through openings in the top of the casing and the stacks of disk springs rest on the top of the casing.

5. A power transmission mechanism for coupling a driving shaft to a driven shaft, which comprises an input shaft adapted to be connected to the driving shaft, a pair of parallel intermediate shafts, gearing connecting the input and intermediate shafts, a pinion on each intermediate shaft, an output shaft adapted to be connected to the driven shaft, a gear mounted on the output shaft and lying between and meshing with the pinions, a flexible membrane connecting said gear to the output shaft, a slide shoe engaging the output shaft from beneath to support it, and means for supporting the shoe for limited movements in all directions in a plane normal to the axis of the output shaft, said means including a pair of springs supporting respective ends of the shoe.

References Cited in the file of this patent

UNITED STATES PATENTS

| | | |
|---|---|---|
| 1,357,674 | Alquist | Nov. 2, 1920 |
| 1,358,615 | Brown | Nov. 9, 1920 |
| 1,383,706 | Farnum | July 5, 1921 |
| 1,893,362 | Given et al. | Jan. 3, 1933 |
| 2,441,901 | Petersen | May 18, 1948 |

FOREIGN PATENTS

| | | |
|---|---|---|
| 560,273 | Great Britain | Mar. 28, 1944 |